United States Patent Office.

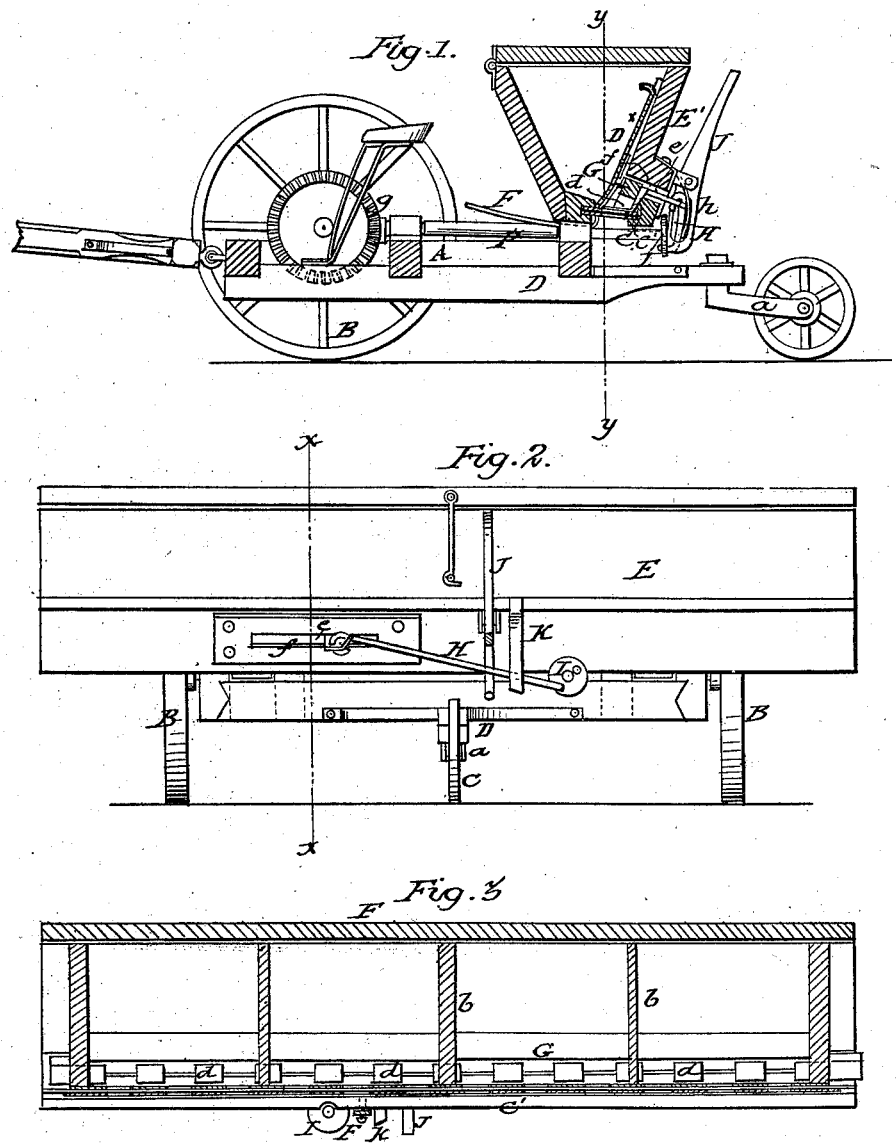

JOSEPH HAAS, OF EL PASO, ILLINOIS.

Letters Patent No. 81,627, dated September 1, 1868.

IMPROVEMENT IN SEEDING-MACHINES.

*The Schedule referred to in these Letters Patent and making part of the same.*

TO ALL WHOM IT MAY CONCERN:

Be it known that I, JOSEPH HAAS, of El Paso, in the county of Woodford, and State of Illinois, have invented a new and improved Broadcast-Seeding Machine; and I do hereby declare that the following is a full, clear, and exact description thereof, which will enable those skilled in the art to make and use the same, reference being had to the accompanying drawings, forming part of this specification.

This invention relates to a new and improved machine for sowing seed broadcast, and it consists in a peculiar construction and arrangement of parts, hereinafter fully shown and described, whereby seed may be sown broadcast in a perfect manner.

In the accompanying sheet of drawings—

Figure 1 is a side sectional view of my invention, taken in the line $x\ x$, fig. 2.

Figure 2, a rear view of the same in elevation.

Figure 3, a transverse vertical section of the same, taken in the line $y\ y$, fig. 1.

Similar letters of reference indicate corresponding parts.

A represents a rectangular frame, the front part of which is supported by two wheels, B B, and the rear part by a caster-wheel, C, which is fitted in an arm, $a$, pivoted to the rear end of a bar, D, secured longitudinally and centrally to the frame A, and extending some distance beyond its rear end, as shown in fig. 1.

On the rear part of the frame A, the seed-box E is placed, and the caster-wheel C serves to support the same, and prevent the front part of the frame A from tilting upward.

The seed-box projects beyond each side of the frame A, and is divided into compartments by partitions $b$, a slide, $D^\times$, being fitted in each compartment, to prevent the discharge of seed when required.

The front and rear sides of the seed-box are inclined, and in the lower part of the latter there are placed the perforated plates $c\ c'$, the upper plate, $c$, being fixed, and the lower one, $c'$, being adjustable, and moved in a longitudinal direction by means of a lever, F.

By moving this lower plate, $c'$, the capacity of the perforations in the plates may be varied according to the amount of seed to be sown on a given area.

Within the seed-box there is placed a reciprocating bar, G, provided with pendent cups, $d$, of rubber or other material.

These cups work in contact with the upper plate, $c$, and they serve to carry the seed to the perforations in said plate, and insure an even distribution or discharge of the same, and prevent the seed-box from choking or clogging.

This reciprocating bar G is operated by a connecting-rod, H, one end of which is attached to an arm, $e$, projecting from the rear of the bar G, and extending through a slot, $f$, in the rear of the seed-box, the opposite end of the connecting-rod being bent in hook-form, and fitted in a hole in a crank-pulley, I, at the rear end of a shaft, $I^\times$, which is rotated by bevel-gears $g$, from the axle of one of the wheels B.

The connecting-rod H passes through an oblong slot, $h$, in a lever, J, attached to the rear of the seed-box, and a spring, K, attached to the latter, has a tendency to keep the connecting-rod in gear with the crank-wheel, said rod being thrown out of gear with the crank-wheel when it is desired to render the bar G inoperative, as in moving the machine from place to place.

By means of the slides $D^\times$, the end-compartments, or any other compartment, may be closed or shut off, and the discharge of seed prevented when not required, and no portion of the ground have seed discharged upon it twice.

The seed-box may be permanently attached to the frame A, or connected by hooks and hinges, so that it may be detached at any time when required.

I claim as new, and desire to secure by Letters Patent—

1. The placing of the seed-box E upon the frame A, behind the wheels B, when the lower part of said frame is supported by a caster-wheel, C, applied to a bar, D, secured to the under side of the frame A, and all arranged substantially in the manner as and for the purpose set forth.

2. The arrangement of the lever J and spring K, and the connecting-rod H, substantially as shown and described, for the purpose of disconnecting the rod H from the crank-pulley, when necessary or desired.

JOSEPH HAAS.

Witnesses:
BERNARD DUEHR,
FRIEDRICH HEINS.